No. 735,281. PATENTED AUG. 4, 1903.
A. L. F. MITCHELL & C. W. AIKEN.
FEEDING MECHANISM FOR POWDERED MATERIAL.
APPLICATION FILED MAR. 13, 1902.
NO MODEL.
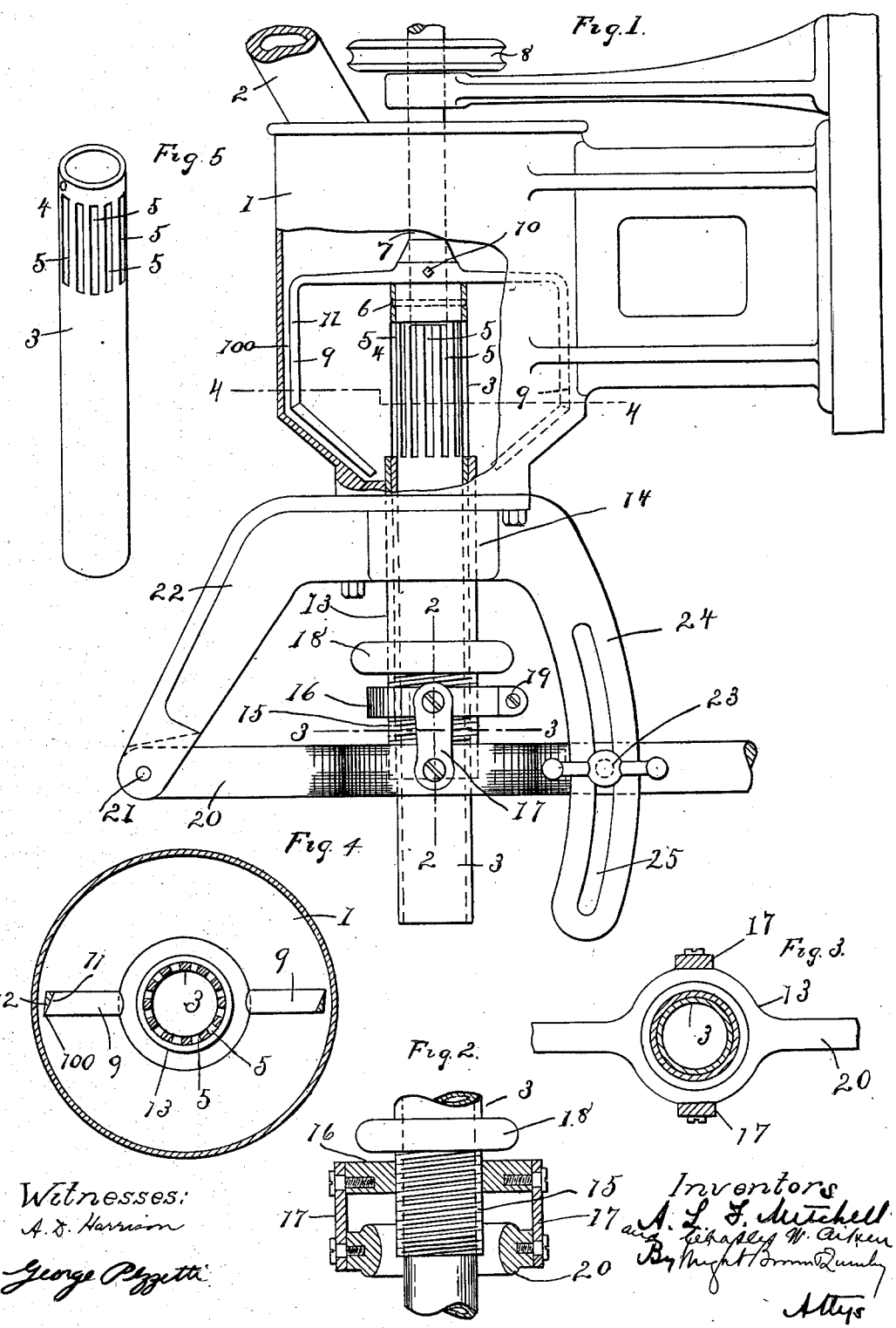

No. 735,281. Patented August 4, 1903.

UNITED STATES PATENT OFFICE.

ALBION L. F. MITCHELL, OF EAST BOSTON, MASSACHUSETTS, AND CHARLES W. AIKEN, OF EAST ORANGE, NEW JERSEY.

FEEDING MECHANISM FOR POWDERED MATERIAL.

SPECIFICATION forming part of Letters Patent No. 735,281, dated August 4, 1903.

Application filed March 13, 1902. Serial No. 98,350. (No model.)

*To all whom it may concern:*

Be it known that we, ALBION L. F. MITCHELL, of East Boston, county of Suffolk, State of Massachusetts, and CHARLES W. AIKEN, of East Orange, in the county of Essex and State of New Jersey, have invented certain new and useful Improvements in Feeding Mechanism for Powdery Materials, of which the following is a specification.

This invention relates to mechanism for feeding powdery materials having a caking tendency to a weighing or other mechanism.

The invention consists in certain novel features of construction and arrangement which we shall now proceed to describe and claim.

Of the accompanying drawings, forming a part of this application, Figure 1 represents a side elevation, partly in section, showing a feeding mechanism constructed in accordance with our invention. Fig. 2 represents a section on the line 2 2 of Fig. 1. Fig. 3 represents a section on the line 3 3 of Fig. 1. Fig. 4 represents a section on the line 4 4 of Fig. 1. Fig. 5 represents a perspective view of the feed-tube.

The same reference characters indicate the same parts in all the figures.

In the drawings, 1 is a vertical hopper supplied with material through a chute 2 or otherwise, and 3 is a vertical outlet or delivery tube having a cage-like inlet portion 4 within the hopper, said inlet portion being provided with a series of slots 5 5, constituting an inlet to the tube 3 and an outlet from the hopper. The tube 3 is secured by a pin 6 to the lower end of a vertical shaft 7, mounted to rotate in suitable bearings and provided with a belt-pulley 8 for rotating it.

9 9 are arms or blades, the number of which may be varied, secured to the shaft 7 by a set-screw 10 in their hub and rotating with said shaft and with the tube 3, each blade constituting a stirrer which rotates near the walls of the hopper in a circular path circumscribing the central axis of the hopper and tube. As seen in Fig. 4, each blade has a working edge 100, which advances through the material and tends to agitate it, and a propelling inner face 11, inclined inwardly from said working edge, so as to exert a cam action on the material and tend to force it into the tube 3 through those slots 5 which are directed toward the stirrer. The stirrer also has an outer face 12, receding or inclined inwardly from the working edge 100, so as to have a clearance from the outer portion of the material and prevent said outer portion from sticking to the stirrer. In addition to the agitating and centripetal forcing effect of the stirrer 9 on the material the cage-like inlet portion of the tube 3 itself has an agitating effect on the material in the hopper, whereby the rotation of the tube 3 causes the material to fall into said tube through the slots 5.

It will be observed that, in effect, the stirrers and the feed-tube act as separate agitators. The stirrers agitate the material which is at a distance from the feed-tube, while the feed-tube itself agitates and takes in through the openings in said tube the material which is close thereto.

The apparatus herein described and claimed is particularly adapted for feeding soap-powder, the nature and consistency of which are such that it has a tendency to cake or adhere. Without the stirrers 9 the material would bank up in the hopper to a point that would leave a slightly-inclined wall of the material surrounding the feed-tube at such a slight distance therefrom that more of the material could not well be fed into the space. The stirrers or blades 9 agitate the material and feed it centripetally toward the tube, and therefore prevent the caking or adhesion of the material in mass at the bottom of the hopper. There is a coaction between the two spaced or separate rotary feeders and stirrers, because while the one discharges the material after agitating so much of it as is closely adjacent thereto the outer one prevents the material from being packed outward by the inner one.

13 is a cylindrical sleeve which snugly fits an aperture in a mouthpiece 14 at the lower end of the hopper 1 and surrounds the delivery-tube 3. The lower end of said sleeve 13 is screw-threaded at 15 and engaged with an internal thread formed in a split collar 16, which is held from rotation by links 17 17, attaching it to a lever 20. Said lever is pivoted at 21 to an arm 22, rigid with the mouthpiece 14, and may be oscillated either by hand or otherwise. It is adapted to be fixed in different positions by means of a fastening-bolt 23, coöperating with a fixed segment 24, having a slot 25 to receive the bolt. The oscillatory movement of the lever 20 slides the tubular gate or valve 13 up or down on the delivery-tube 3, causing the upper portion of the valve to uncover a greater or less portion of the slots 5 5 and by thus varying the size of the outlet from the hopper to vary the quantity of material that can pass into the delivery-tube 3 in a given time. Above the collar 16 the sleeve 13 is provided with a boss or flange 18, which constitutes a hand-wheel, whereby said sleeve may be rotated. An adjusting-screw 19 permits the pressure of the collar 16 to be adjusted, so as to normally prevent the rotation of the sleeve 13 by the friction of the rotating tube 3; but a person by grasping the hand-wheel 18 may rotate the sleeve 13 within the collar 16, the said collar acting as a fixed nut which causes the sleeve to move axially by reason of its rotation. The said axial movement of the sleeve changes its adjustment with respect to the lever 20.

Various modifications may be made in the above-described embodiment of our invention without departing from the spirit thereof.

We claim—

1. In a feed mechanism the combination of a hopper, an outlet-tube leading downward therefrom and having an inlet within the hopper, and a sleeve-shaped valve or gate mounted to slide on said tube to vary the size of said inlet and correspondingly vary the amount of material fed through said tube, said valve or gate being provided with means whereby it may be manually adjusted and left in adjusted position.

2. In a feed mechanism the combination of a hopper, an outlet-tube leading therefrom and having an inlet within the hopper, a sleeve-shaped valve or gate mounted to slide on said tube to vary the size of said inlet, and having a threaded portion, a nut engaging said threaded portion, whereby the rotation of said gate adjusts it axially, a pivoted lever, and a link connecting said lever and nut, whereby to operate the valve.

3. In a feed mechanism the combination of a hopper, a rotary outlet-tube having an inlet within the hopper, and a stirrer mounted to rotate with said tube and separated therefrom by a space sufficient to permit the tube and stirrer to act separately on the material.

4. In a feed mechanism the combination of a hopper, a rotary outlet-tube having an inlet within the hopper, a stirrer mounted to rotate with said tube and separated therefrom by a space, said stirrer having an inner propelling-face inclined so as to force the material into said inlet.

5. In a feed mechanism the combination of a hopper, a rotary outlet-tube having an inlet portion within the hopper, and a stirrer mounted to rotate with said tube and separated therefrom by a space, said stirrer formed to force the material toward the tube, said tube having an inlet exposed laterally toward the stirrer.

6. In a feed mechanism the combination of a hopper, a rotary tube having an inlet within the hopper, a stirrer mounted to rotate with said tube and separated therefrom by a space, said stirrer formed to force the material into said inlet, and a gate or valve movable to vary the size of said inlet.

In testimony whereof we have affixed our signatures in presence of two witnesses.

ALBION L. F. MITCHELL.
CHARLES W. AIKEN.

Witnesses for Mitchell:
C. F. BROWN,
A. D. HARRISON.

Witnesses for Aiken:
FREDERICK A. BOLAND,
S. H. KAY.